(12) United States Patent
Locatelli et al.

(10) Patent No.: US 8,154,324 B2
(45) Date of Patent: Apr. 10, 2012

(54) HALF BRIDGE DRIVER INPUT FILTER

(75) Inventors: Christian Locatelli, Broni (IT);
Giovanni Galli, Saonara (IT)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/684,305

(22) Filed: Mar. 9, 2007
(Under 37 CFR 1.47)

(65) Prior Publication Data
US 2008/0054998 A1  Mar. 6, 2008

Related U.S. Application Data

(60) Provisional application No. 60/781,889, filed on Mar. 13, 2006.

(51) Int. Cl.
*H03K 5/00* (2006.01)

(52) U.S. Cl. ......... 327/109; 327/290; 327/344; 327/552

(58) Field of Classification Search .......... 327/108–112, 327/290, 344, 423, 424, 494–497, 552–559, 327/587, 588
See application file for complete search history.

(56) References Cited

U.S. PATENT DOCUMENTS

| 3,058,113 | A  | * | 10/1962 | Wilson ............................. 360/29 |
| 6,859,087 | B2 | * | 2/2005  | Galli et al. ..................... 327/423 |
| 7,049,863 | B2 | * | 5/2006  | Bechman et al. ............. 327/112 |
| 7,301,376 | B2 | * | 11/2007 | Capodivacca et al. ........ 327/112 |

FOREIGN PATENT DOCUMENTS

| EP | 397241   | A1 | * | 11/1990 |
| JP | 02-192214 |    |   | 7/1990  |
| JP | 02192214 | A  | * | 7/1990  |

* cited by examiner

*Primary Examiner* — Lincoln Donovan
*Assistant Examiner* — Patrick O'Neill
(74) *Attorney, Agent, or Firm* — Farjami & Farjami LLP

(57) ABSTRACT

A driver integrated circuit for driving at least one high voltage half bridge stage. The driver including a filter circuit for filtering a signal provided to the half bridge stage, a minimum pulse width of the signal being near a constant time of the filter, wherein the filter circuit prevents distortions introduced when the signal is at its minimum pulse width from being passed to the half bridge stage.

18 Claims, 3 Drawing Sheets

US 8,154,324 B2

HALF BRIDGE DRIVER INPUT FILTER

CROSS-REFERENCE TO RELATED APPLICATION

This application is based on and claims priority to U.S. Provisional Patent Application Ser. No. 60/781,889, filed on Mar. 13, 2006 and entitled HV HALF BRIDGE DRIVER INPUT FILTER, the entire contents of which are hereby incorporated by reference herein.

BACKGROUND OF THE INVENTION

The present invention relates to driver circuits, e.g., driver integrated circuits, for driving high voltage half bridge stages, and more particularly to filter circuits used in the gate driver circuits for filtering signals to the control terminals of switches of the half bridge stages.

FIG. 1 illustrates a circuit 10 having a traditional RC filter that includes a resistor and a capacitor. A resistor R is series coupled between an inverter 12 through which input IN is received and an amplifier 14 through which an output OUT is provided. A capacitor C is coupled to a node N between the resistor R and the amplifier 14 and to the ground. Amplifiers used in such circuits have output threshold settings. For the amplifier 14, there are thresholds of $V_{TH}+$ and $V_{TH}-$, which are exemplary set at ⅔ and ⅓ of $V_{CC}$, respectively.

A minimum pulse width of the input signal IN, i.e., near a constant time τ of the RC filter can cause a pulse width distortion between pulse widths of the input and output signals IN and OUT when the RC filter of the circuit 10 is used in the high voltage half-bridge driver.

As illustrated in FIG. 2, a pulse width of the input signal IN, e.g., 500 μs, becomes comparable with a time constant τ of the RC filter, which determines a cutoff frequency. As the voltage in the RC filter decreases from $V_{TH}+$ to $V_{TH}-$, an output signal OUT, for example, an illustrated 50 μs, passes through the gate driver logic circuit 10 to a control terminal of a switch in a high voltage half bridge stage.

This occurs due to a pulse distortion introduced by the RC filter and can be very dangerous, especially for a high side channel signal transmission.

As illustrated in FIGS. 3a and 3b (right side), a very short input pulse can create a situation where a "turn-OFF" signal of the high side channel is missed, and then, when a "turn-ON" signal of a low side of the same channel is generated, a shoot-through DC+/DC− current is generated in the external half-bridge. Moreover, as shown in FIGS. 3a and 3b (left side), missing the turn-ON signal of the high side channel will cause a loss of a PWM cycle.

SUMMARY OF THE INVENTION

It is an object of the present invention to provide a filter circuit that prevents signals having pulse width shorter than a minimum from propagating through high voltage half-bridge stages.

A driver integrated circuit is provided for driving at least one high voltage half bridge stage. The driver including a filter circuit for filtering a signal provided to the half bridge stage, the filter circuit having a time constant near a minimum pulse width of the signal and wherein the filter circuit prevents distortions introduced when the signal is at its minimum pulse width from being passed to the half bridge stage.

Other features and advantages of the present invention will become apparent from the following description of the invention that refers to the accompanying drawings.

BRIEF DESCRIPTION OF THE DRAWINGS

FIGS. 3a and 3b are graphs showing the effect on the switching node VS of the input signal with a minimal pulse width leading to a missing PWM cycle and shoot-through.

DETAILED DESCRIPTION OF EMBODIMENTS OF THE INVENTION

Figure 1:
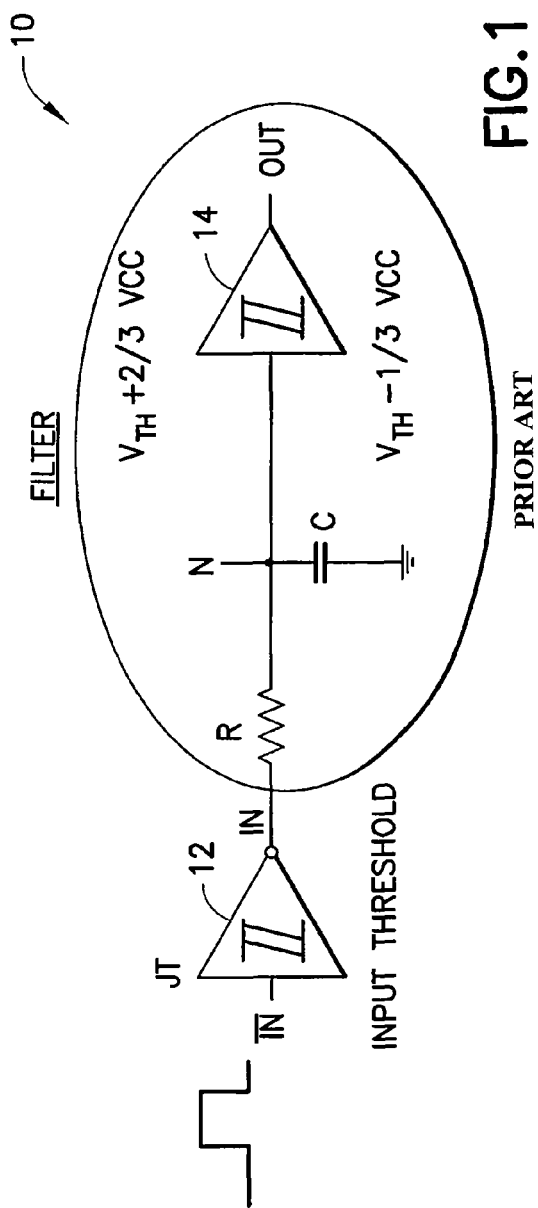
FIG. 1 is a diagram of a commonly used RC filter circuit.
Figure 2:
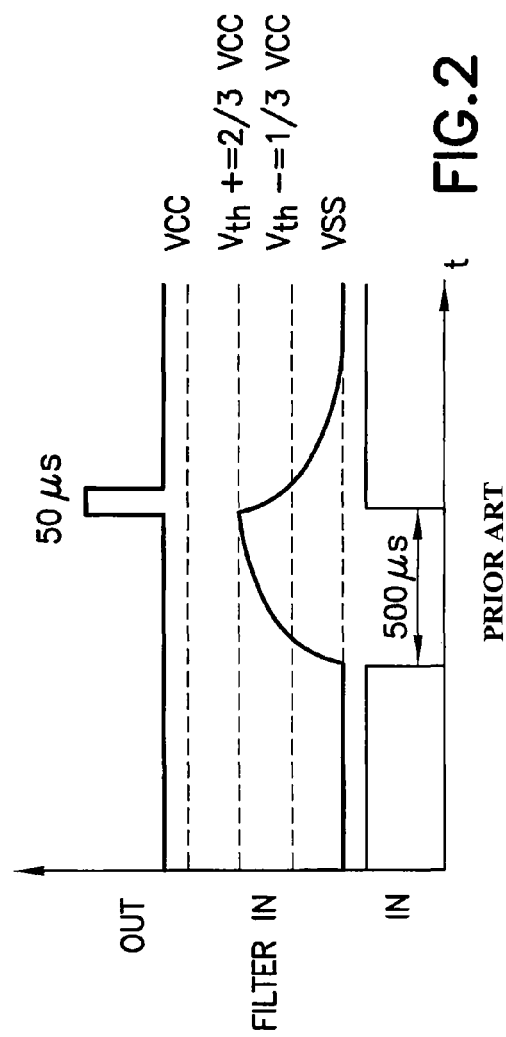
FIG. 2 is a graph showing a distortion in an output signal caused by an input signal with a minimal pulse width when an RC input filter is used.
Figure 3A:
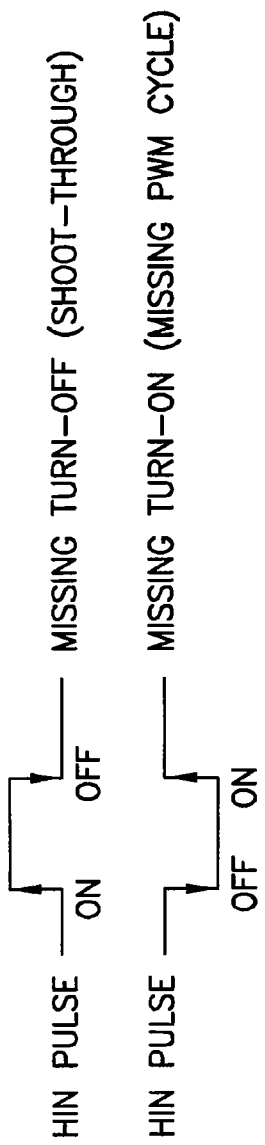
Figure 3B:
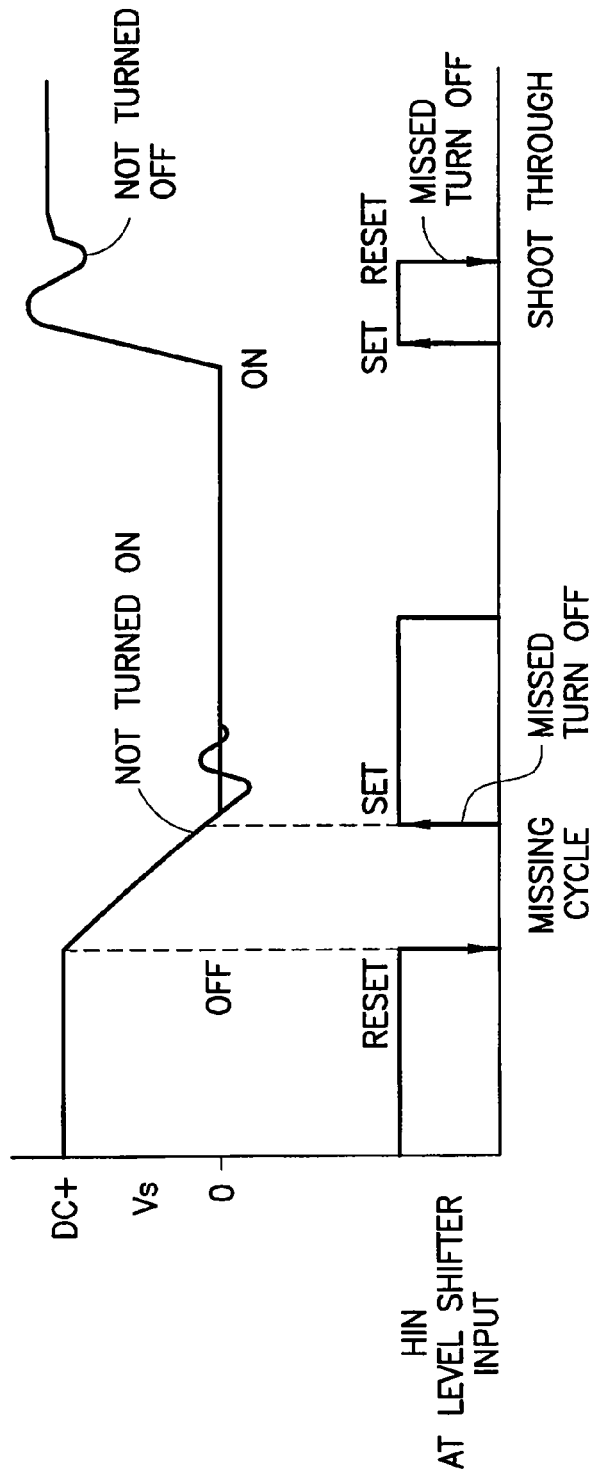
Figure 4:
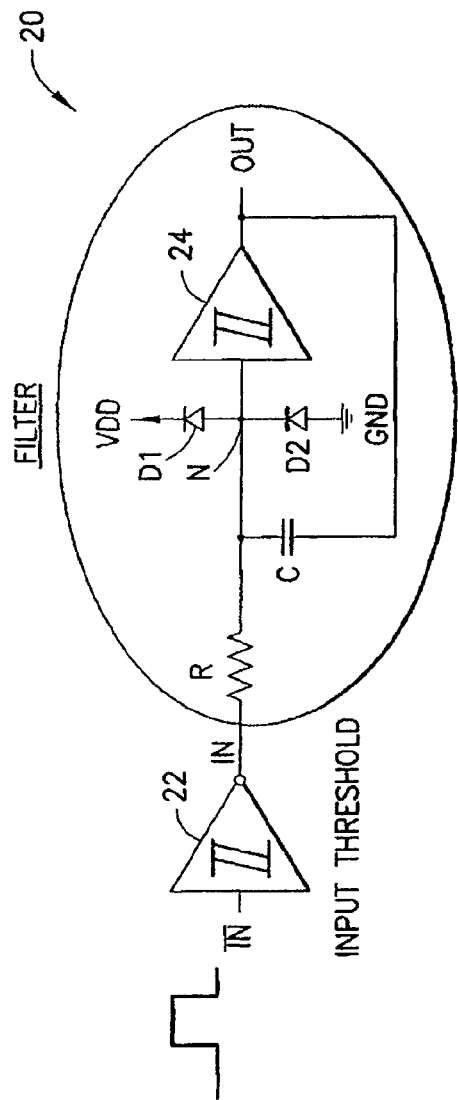
FIG. 4 is a diagram of a circuit of the preferred embodiment of the present invention having a reset filter circuit.

The present invention corrects the above-described deficiency by providing an alternative to the RC filter. FIG. 4 illustrates a circuit 20 having a resistor R series coupled between an inverter 22 having an input threshold and through which input IN is received and an amplifier 24 through which an output OUT is provided. A capacitor C is coupled across the amplifier 24 between input and output. The amplifier has the same $V_{TH}+$ and $V_{TH}-$ thresholds as discussed above.

Figure 5:
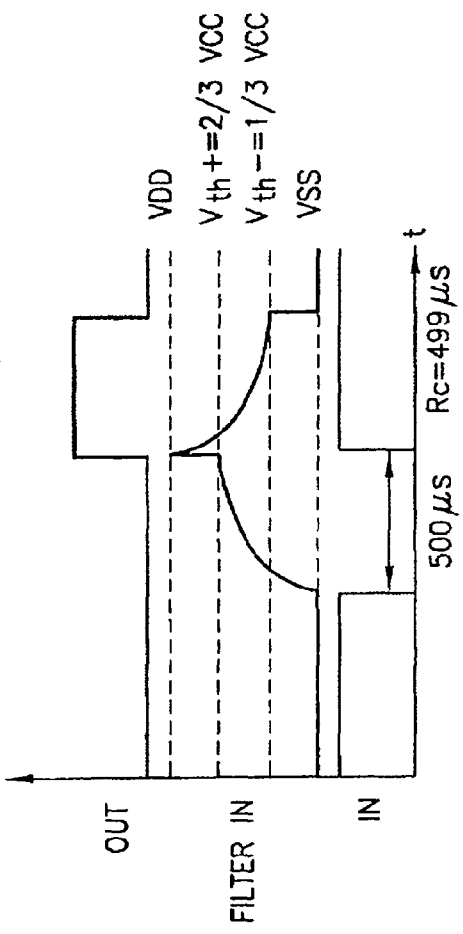
FIG. 5 is a graph showing that no distortion in the output signal is caused by an input signal with a minimal pulse width when the input filter of the present invention is used.

Additionally, two diodes D1 and D2 are series coupled at a node N between the resistor R and the amplifier 24. The cathode of diode D1 is connected to $V_{DD}$ and the anode of diode D2 is connected to ground The inventive filter allows the circuit 20 to avoid the above-described problem of the DC bus shoot-through. As illustrated in FIG. 5, even the minimum pulse width input signal IN is not affected by the filter distortion. The filter voltage dropping between $V_{TH}+$ and $V_{TH}-$ does not trigger the early shut off of the output signal OUT from the amplifier 24. Indeed, when the signal IN turns off, the capacity charges toward $V_{DD}$ via diode D1. When IN turns back on, the voltage at node N is raised to $V_{DD}$, and then begins to discharge from $V_{DD}$, taking approximately the same time as the input pulse width to reach the turn off threshold $V_{TH}-$. This guarantees that signals having pulse width shorter than the minimum cannot propagate through the high voltage half-bridge stage.

As shown in FIG. 5, the RC filter time constant is 499 μs. The input signal pulse width of about 500 μs, substantially the same as the RC time constant, results in an output pulse width of substantially 500 μs. A pulse of a shorter duration is not generated, ensuring that shoot-through and/or a missed PWM cycle does not occur in the driven half-bridge.

Although the present invention has been described in relation to particular embodiments thereof, many other variations and modifications and other uses will become apparent to those skilled in the art. It is preferred, therefore, that the present invention not be limited by the specific disclosure herein.

What is claimed is:
1. A driver circuit for driving at least one high voltage half bridge stage having a switch, the driver circuit comprising:
   a filter circuit;
   an inverter for receiving a signal into the filter circuit; and
   an amplifier for sending the signal out of the filter circuit;
   wherein the filter circuit includes:
      a resistor series coupled between the inverter and the amplifier;
      a capacitor coupled between an input and output of the amplifier; and first and second diodes series coupled at a node between the resistor and the amplifier, a cathode of the first diode being connected to a supply voltage potential and an anode of the second diode being connected to the supply voltage return;

wherein the filter circuit sets an output signal of the amplifier to a first reference value corresponding to a logical HIGH in response to a voltage at the node exceeding a threshold value corresponding to the logical HIGH; and wherein the filter circuit lowers the voltage at the node to a reference $V_{SS}$ when the filter circuit sets the output signal of the amplifier to a second reference value corresponding to a logical LOW.

2. The driver circuit of claim 1, wherein the inverter and the amplifier have thresholds.

3. The driver circuit of claim 1, wherein the amplifier has a turn on threshold of $V_{TH}+$ and a turn off threshold of $V_{TH}-$.

4. The driver circuit of claim 3, wherein the turn on threshold of $V_{TH}+$ is about ⅔ of a $V_{CC}$ and the turn off threshold of $V_{TH}-$ is about ⅓ of the $V_{CC}$.

5. The driver circuit of claim 1, wherein the filter circuit is coupled to a half bridge stage and has a time constraint near a minimum pulse width of the signal and wherein the filter circuit is configured to prevent distortions introduced when the signal is at its minimum pulse width from being passed to the half bridge stage.

6. The driver circuit of claim 5, wherein the time constant of the filter circuit is determined by the resistor and the capacitor, and wherein the supply voltage potential charges the capacitor when the signal turns off, and wherein a voltage at the input of the amplifier increases to the supply voltage potential above a turn on threshold of the amplifier when the signal turns on, thereby allowing the capacitor to discharge for a time period substantially equal to the minimum pulse width of the signal.

7. The driver circuit of claim 1, wherein the voltage at the node takes approximately a same time as a signal width of the signal to reach a turn off threshold of the amplifier.

8. A filter providing an output signal to an output stage, the filter comprising:

a resistor receiving an input signal from an inverter;

a common node coupled to the resistor, a capacitor, a plurality of diodes, and an amplifier;

wherein the filter raises a voltage at the common node above a threshold value corresponding to a logical HIGH which triggers the amplifier to generate the output signal with a first reference value corresponding to the logical HIGH; and wherein the filter lowers the voltage at the common node to a reference $V_{SS}$ when the filter triggers the amplifier to generate the output signal of the amplifier with a second reference value corresponding to a logical LOW.

9. The filter of claim 8, wherein the filter lowers the voltage at the common node below another threshold value corresponding to the logical LOW which triggers the amplifier to generate the output signal with the second reference value corresponding to the logical LOW.

10. The filter of claim 8, wherein the output stage is a half bridge output stage.

11. The filter of claim 8, wherein the output signal has a pulse width approximately equal to a pulse width of the input signal.

12. The filter of claim 8, wherein the amplifier and the capacitor are coupled to an output node.

13. The filter of claim 8, wherein the plurality of diodes comprises a diode coupled to the common node and a ground terminal.

14. The filter of claim 13, wherein the diode comprises an anode terminal connected to the ground terminal.

15. The filter of claim 13, wherein the diode comprises a cathode terminal coupled to the common node.

16. The filter of claim 8, wherein the plurality of diodes comprises another diode coupled to the common node and a positive reference voltage.

17. The filter of claim 16, wherein the another diode comprises a cathode terminal coupled to the positive reference voltage.

18. The filter of claim 16, wherein the another diode comprises an anode terminal coupled to the common node.

* * * * *